United States Patent
Schwark et al.

(10) Patent No.: US 7,029,025 B2
(45) Date of Patent: Apr. 18, 2006

(54) TEAR SEAM FOR AIR BAG MODULE

(75) Inventors: Diane M. Schwark, Lenox, MI (US); Michael Dagosto, Shelby Township, MI (US); Juan C. Martinez, Chihuahua (MX)

(73) Assignee: TRW Vehicle Safety Systems Inc., Lyndhurst, OH (US)

( * ) Notice: Subject to any disclaimer, the term of this patent is extended or adjusted under 35 U.S.C. 154(b) by 0 days.

(21) Appl. No.: 10/246,842

(22) Filed: Sep. 19, 2002

(65) Prior Publication Data

US 2004/0056454 A1 Mar. 25, 2004

(51) Int. Cl.
B60R 21/20 (2006.01)

(52) U.S. Cl. .................... 280/728.3; 280/731

(58) Field of Classification Search ............ 280/728.3, 280/731, 732, 730.2
See application file for complete search history.

(56) References Cited

U.S. PATENT DOCUMENTS

| | | | | |
|---|---|---|---|---|
| 5,060,971 A * | 10/1991 | Nanbu et al. | ............ | 280/728.3 |
| 5,172,931 A * | 12/1992 | Baba et al. | ............ | 280/728.3 |
| 5,431,434 A * | 7/1995 | Yamakawa et al. | ...... | 280/728.3 |
| 5,449,197 A * | 9/1995 | Kerner | ........................ | 280/731 |
| 5,744,776 A | 4/1998 | Bauer | ...................... | 219/121.7 |
| 5,913,534 A * | 6/1999 | Klingauf | .................. | 280/728.3 |
| 5,961,143 A * | 10/1999 | Hlywka et al. | .......... | 280/728.3 |
| 6,135,489 A | 10/2000 | Bowers | .................... | 280/728.3 |
| 6,199,897 B1 * | 3/2001 | Kreile | ..................... | 280/728.3 |
| 6,224,090 B1 * | 5/2001 | Lutze et al. | ............. | 280/728.3 |
| 6,402,189 B1 * | 6/2002 | Gray et al. | .............. | 280/728.3 |
| 6,440,514 B1 * | 8/2002 | Ueno et al. | .................. | 428/43 |
| 6,682,091 B1 * | 1/2004 | Mitrowitz et al. | ....... | 280/728.3 |
| 6,733,032 B1 * | 5/2004 | Pinsenschaum et al. | . | 280/728.3 |

FOREIGN PATENT DOCUMENTS

| | | |
|---|---|---|
| DE | 19937373 | 2/2001 |
| DE | 10006483 | 8/2001 |
| EP | 0428935 B1 | 9/1995 |

OTHER PUBLICATIONS

German Appln. No. 199 39 034.7, filed Aug. 18, 1999 entitled "A Leather Cut to Size for a Cover of an Occupant Restraint Module, Cover, Method for Cutting Leather to Size and Apparatus therefor", (English translation).

* cited by examiner

*Primary Examiner*—Paul N. Dickson
*Assistant Examiner*—Laura B. Rosenberg
(74) *Attorney, Agent, or Firm*—Tarolli, Sundheim, Covell & Tummino L.L.P.

(57) ABSTRACT

A rupturable cover (10) for an air bag module (22) comprises an inner cover (30) and an outer cover (80) overlying the inner cover. The inner cover (30) has a first tear seam (70) for enabling rupturing of the inner cover in response to inflation of an air bag (24). The outer cover (80) has a second tear seam (100) for enabling rupturing of the outer cover. The second tear seam (100) has a configuration different from the first tear seam (70). At least a portion of the second tear seam (100) overlies the first tear seam (70) when the outer cover (80) is adhered to the inner cover (30) in any one of a plurality of different positions of alignment. The second tear seam (100) may have a wavy configuration.

16 Claims, 4 Drawing Sheets

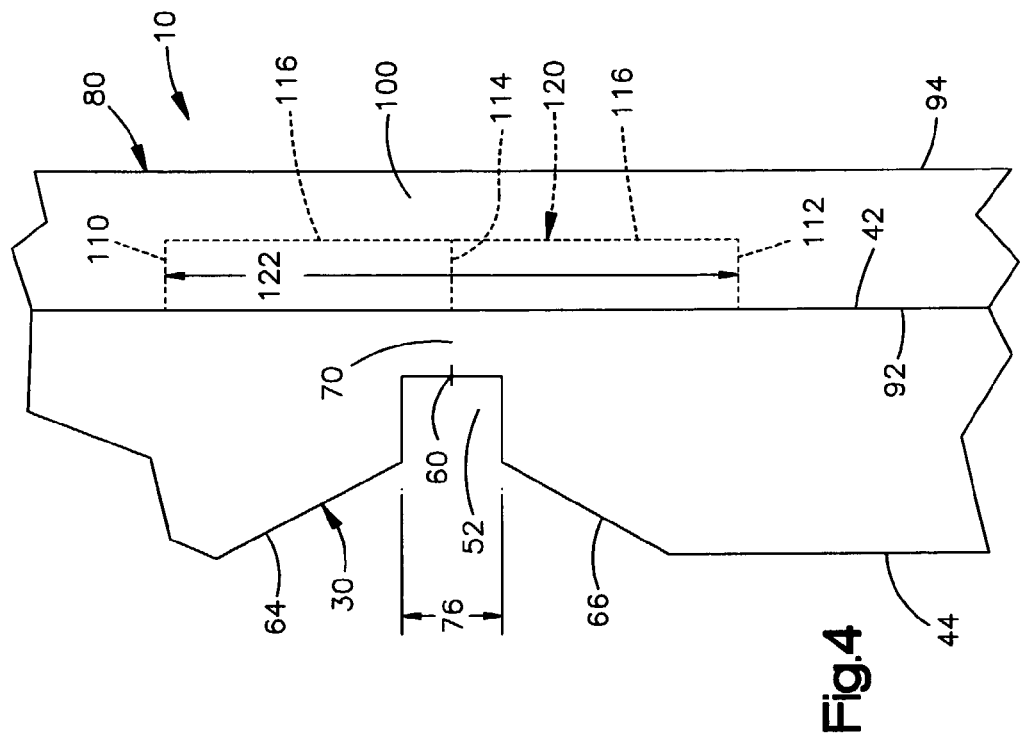
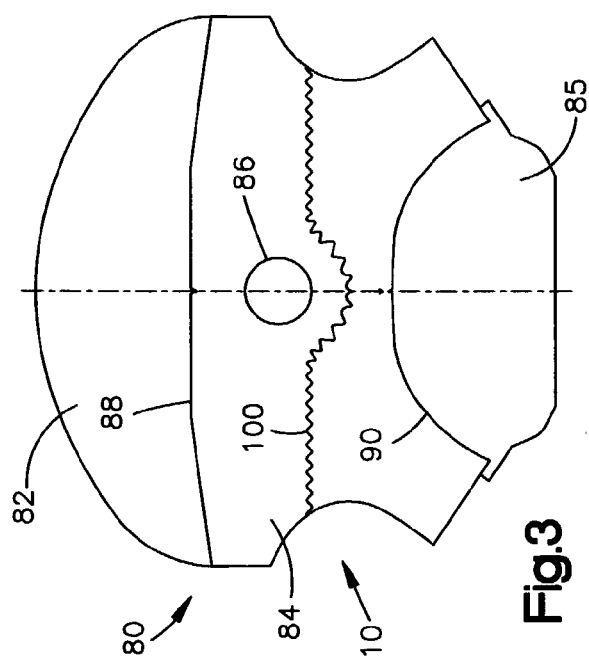
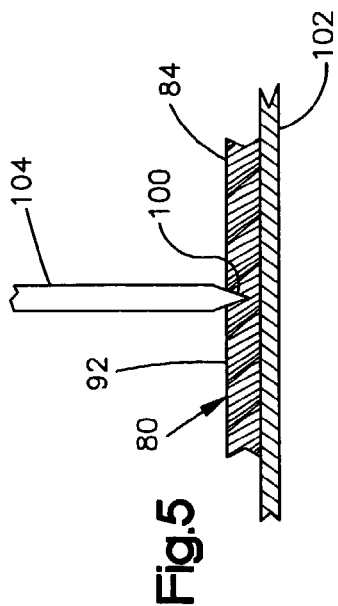

TEAR SEAM FOR AIR BAG MODULE

BACKGROUND OF THE INVENTION

1. Technical Field

The present invention relates to a vehicle occupant protection apparatus. In particular, the present invention relates to a double-layered air bag module cover having a tear seam that ruptures upon inflation of the air bag.

2. Description of the Prior Art

A typical air bag module includes an inflatable vehicle occupant protection device, such as an air bag, and an inflator for inflating the protection device from a deflated condition to an inflated condition to help protect a vehicle occupant. The protection device when in the deflated condition is typically overlaid and hidden from view by a cover. For a frontal module, the cover may be a portion of a vehicle steering wheel or instrument panel. For a side impact module, the cover may be a portion of a door or seat.

An air bag module cover may be a two-layer cover, with an underlying substrate to which there is adhered a decorative cover, such as a leather covering layer. In such a case, each layer of the cover includes a tear seam at which the layer can rupture to enable inflation of the protection device. It is desirable that the two tear seams be aligned with each other so that the cover as a whole ruptures in a predictable manner upon the application of a predetermined amount of force from the inflating air bag.

SUMMARY OF THE INVENTION

The present invention relates to a rupturable cover for a vehicle occupant protection apparatus that includes an inflatable vehicle occupant protection device and an inflator for providing inflation fluid to inflate the protection device from a deflated condition to an inflated condition. The cover overlies the protection device when in the deflated condition. The cover comprises an inner cover, and an outer cover overlying the inner cover. The outer cover has an inner side surface adjacent to and overlying the inner cover, and has an exposed outer side surface. The inner cover has a first tear seam for enabling rupturing of the inner cover in response to inflation of the protection device. The outer cover has a second tear seam for enabling rupturing of the outer cover in response to rupturing of the inner cover. The second tear seam has a configuration different from the first tear seam so that at least a portion of the second tear seam overlies the first tear seam when the outer cover is adhered to the inner cover in any one of a plurality of different positions of alignment relative to the inner cover.

In one embodiment, the first tear seam has a linear configuration, and the second tear seam has a wavy configuration.

BRIEF DESCRIPTION OF THE DRAWINGS

The foregoing and other features of the present invention will become apparent to one skilled in the art to which the present invention relates upon consideration of the following description of the invention with reference to the accompanying drawings, in which:

FIG. 3 is a rear elevational view of a leather substrate covering layer that forms part of the cover of FIG. 1;

FIG. 4 is a sectional view through the cover of FIG. 1 showing an inner tear seam of the substrate and an outer tear seam of the covering layer;

FIG. 5 is a schematic sectional view showing one step in a process of making the outer tear seam of the covering layer;

DETAILED DESCRIPTION OF THE INVENTION

Figure 1:
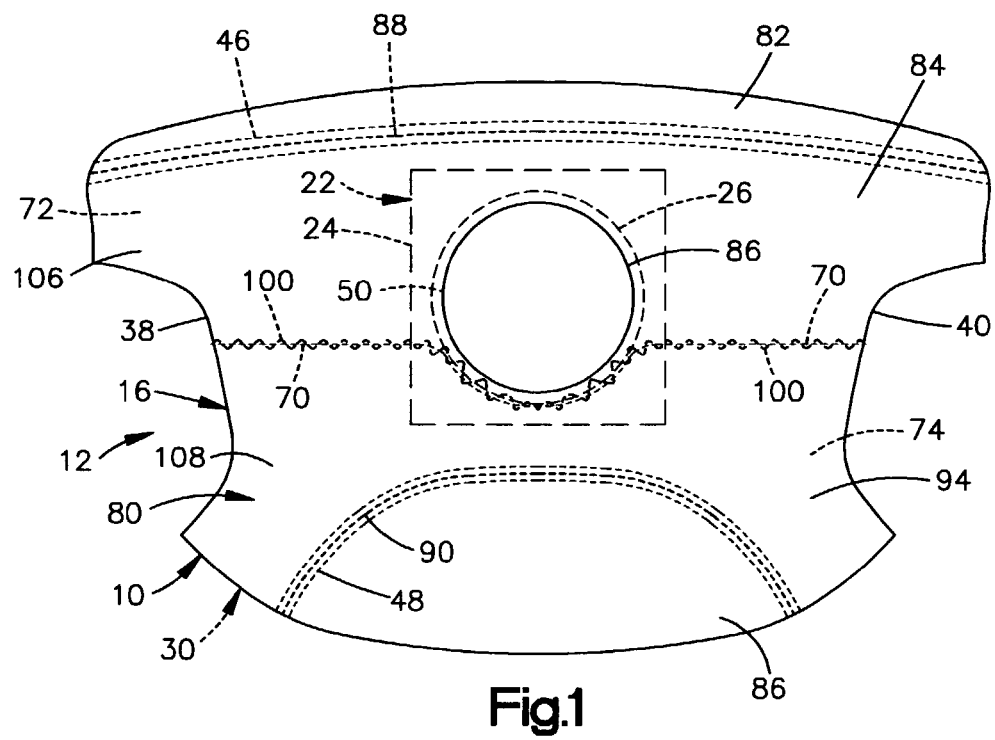
FIG. 1 is a front elevational view of a cover for a vehicle occupant protection apparatus including an inflatable vehicle occupant protection device and an inflator, constructed in accordance with the present invention.

The present invention relates to a vehicle occupant protection apparatus. In particular, the present invention relates to a double-layered air bag module cover having a tear seam that ruptures upon inflation of the air bag. As representative of one embodiment of the present invention, FIG. 1 illustrates a cover 10 that forms part of a steering wheel assembly 12.

The steering wheel assembly 12 includes a hub portion 16. An air bag module shown schematically at 22 is located on the hub portion 16 of the steering wheel assembly 12. The air bag module 22 includes an inflatable vehicle occupant protection device in the form of an air bag 24. The air bag module 22 also includes an inflator 26 that is actuatable in a known manner to supply inflation fluid for inflating the air bag 24. The cover 10 encloses and covers the air bag module 22.

It should be understood that the present invention is applicable to different types of covers 10. For example, the cover 10 could be part of or attached to a vehicle instrument panel for covering a passenger side air bag module. Alternatively, the cover 10 could be part of a seat or a door for covering a side impact air bag module.

Figure 2:
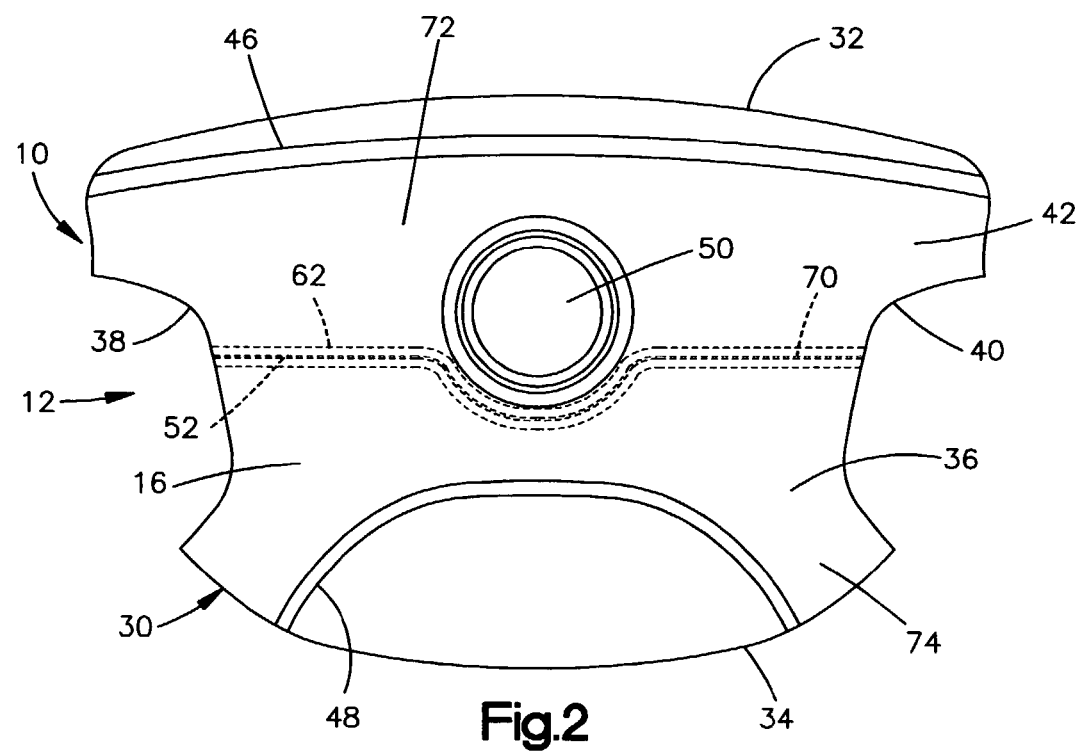
FIG. 2 is a front elevational view of a substrate that forms part of the cover of FIG. 1.

The cover 10 includes a substrate or inner cover 30 (FIGS. 1 and 2), and a substrate covering layer or outer cover 80 (FIG. 3). The inner cover 30 is preferably molded as one piece from a plastic material and has a top wall 32, a bottom wall 34, and a front wall 36 that faces the vehicle driver. The front wall 36 has a left side edge 38 and a right side edge 40. The front wall 36 also has an outer side surface 42 and an opposite inner side surface 44 (FIG. 4).

An upper groove 46 (FIG. 1) extends across the outer side surface 42 of the inner cover 30 between the left and right side edges 38 and 40. A lower groove 48 also extends across the outer side surface 42 of the inner cover 30 between the left and right side edges 38 and 40. An emblem recess 50 is also formed in the outer side surface 42 of the inner cover 30, at a laterally central location between the upper and lower grooves 46 and 48.

The inner cover 30 includes an inside groove 52 formed on the inner side surface 44 of the front wall 36 of the inner cover. The inside groove 52 (FIG. 4) has a generally rectangular configuration in cross-section. The inside groove 52 has a centerline 60.

The inside groove 52 is contained within a larger groove 62 defined by two angled surfaces 64 and 66. A relatively thin portion 70 of the material of the inner cover 30 is located outward of the groove 52. This larger groove 62 allows the plastic material of the inner cover 30, when molded, to flow consistently around the groove 52 to form the material portion 70, by having a more gradual change to the material thickness, instead of an abrupt change.

The presence of the groove 52 in the inner cover 30 weakens the inner cover in the immediately surrounding area. The relatively thin material portion 70 immediately outward of the groove 52 constitutes a predetermined weakened portion, or inner tear seam, of the inner cover 30. The inner tear seam 70 extends across the inner cover 30 between the left and right side edges 38 and 40. The inner tear seam 70 divides the inner cover into an upper cover portion 72 and a lower cover portion 74.

The inner tear seam 70 extends along a first path and has a first width 76 (measured in an up and down direction as viewed in FIG. 4, or transverse to the length of the inner tear seam). The inner tear seam 70 has a relatively narrow, linear configuration, and therefore the first width 76 of the inner tear seam is relatively small. In the illustrated embodiment, the inner tear seam 70 has a width of about 0.3 millimeters to about 0.6 millimeters. The centerline 60 of the groove 52 forms a centerline of the inner tear seam 70.

The outer cover 80 is adhered to the inner cover 30 and is used to provide a more decorative finish to the cover 10. In the illustrated embodiment, for example, the outer cover 80 is made from leather, while the inner cover 30 is made from molded plastic.

The outer cover 80 in the illustrated embodiment is made from three separate pieces of leather that are sewn together to form the outer cover. The three pieces include an upper piece 82, a middle piece 84, and a lower piece 85. The outer cover 80 could, alternatively, be made from only one piece of leather.

The upper piece 82 is sized to cover the top wall 32 of the inner cover 30 and a small portion of the front wall 36. The lower piece 85 is sized to cover a lower portion of the front wall 36 of the inner cover 30 and a portion of the bottom wall 34 of the inner cover. The middle piece 84 of the outer cover 80 is sized to cover the middle portion of the front wall 34 of the inner cover 30. The middle piece 84 of the outer cover 80 of the outer cover has an emblem opening 86 that is the same size as the emblem recess 50 in the inner cover 30.

The upper piece 82 of the outer cover 80 is sewn to the middle piece 84 with an upper stitching section 88. The lower piece 85 of the outer cover 80 is sewn to the middle piece 84 with a stitching section 90.

The middle piece 84 of the outer cover 80 has an inner side surface 92 and an outer side surface 94. When the outer cover 80 is adhered to the inner cover 30 as described below, the inner side surface 92 of the middle piece 84 of the outer cover 80 lies against the outer side surface 42 of the inner cover 30, and the outer side surface 94 of the middle piece of the outer cover is exposed.

An outer tear seam 100 is formed in the outer cover 80 in a manner described below. The outer tear seam 100 is a thin, uncut portion of the material of the outer cover 30. In the illustrated embodiment, the outer tear seam 100 is formed in the middle piece 84 of the outer cover 80.

The outer tear seam 100 is formed by cutting into the material of the middle piece 84 of the outer cover, in a manner shown schematically in FIG. 5. The outer cover 80 is stretched flat on a table 102, with the inner side surface 92 of the middle piece 84 facing up towards a movable blade shown schematically at 104. The blade 104 is moved up and down relative to the table 102 and to the outer cover 80. The blade 104 cuts into the material of the middle piece, rather than making a depression in the material.

The blade 104 is moved relative to the middle piece along a predetermined path to provide the outer tear seam 100 with its predetermined configuration. Each downward movement of the blade 104 makes a short linear cut, rather than a pointed cut like a needle. The blade 104 is rotated as it moves along the path, so that the cutting action of the blade results in a series of overlapping linear cuts each of which extends along the path of movement of the blade, forming a continuous cut.

The movement of the blade 104 is set so that it comes down to a predetermined distance from the table 102, leaving a relatively thin, uncut material portion 100. The thickness of this material portion 100 is constant, regardless of the overall thickness of the outer cover 80 prior to cutting. In the illustrated embodiment, the leather material of the outer cover 80 is about one millimeter thick. The blade 104 is set so that it comes down to within 0.4 millimeters (four tenths of a millimeter) of the table 102.

The relatively thin uncut portion 100 of the middle piece 84 of the outer cover 80 forms the outer tear seam of the cover 10. The outer tear seam 100 is a predetermined weakened portion of the outer cover 80 that extends across the cover 10 between the left and right side edges 38 and 40. The tear seam 100 divides the outer cover 80 into an upper cover portion 106 and a lower cover portion 108. The outer cover 80 is rupturable at the tear seam 100 in response to inflation of the air bag 24, as described below.

The outer tear seam 100 is located on the inner side surface 92 of the middle piece 84 of the outer cover 80. The outer tear seam 100 is not located on, and does not show through, the exposed outer side surface 94 of the outer cover 80.

The configuration of the outer tear seam 100 is different from the configuration of the inner tear seam 70. Specifically, the outer tear seam 100 is relatively wide, in comparison to the relatively narrow inner tear seam 70. Also, the outer tear seam 100 has a curvilinear, serpentine, or wavy configuration, in comparison to the linear configuration of the inner tear seam 70.

In the illustrated embodiment, the outer tear seam 100 has a configuration similar to that of a sine wave, with a regular series of crests 110 and troughs 112 spaced equally on opposite sides of a centerline 114. The crests 110 and troughs 112 form a plurality of undulations 116. The tear seam 100 could alternatively have an irregular wavy or undulating configuration, rather than the regular configuration of the sine wave shown.

The outer tear seam 100 extends along the outer cover 80 over a second path 120 having a second width 122 (FIG. 4). The second width 122 is measured between a line through the crests 110 and a line through the troughs 112. The width of the path 122 of the outer tear seam 100 is substantially greater than the width 76 of the inner tear seam 70.

Figure 6:
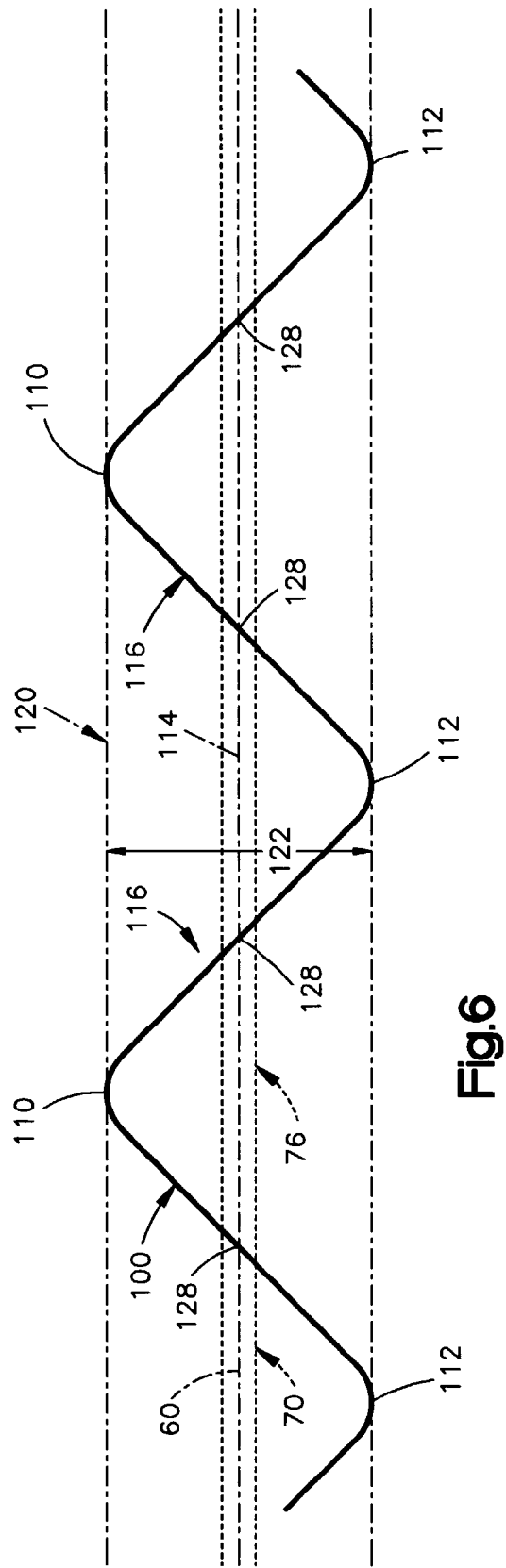
FIG. 6 is a schematic front elevational view of the assembled substrate and substrate covering layer, showing the alignment of the outer tear seam and the inner tear seam.

In one embodiment, the width 122 (FIG. 6) of the outer tear seam 100, that is, the distance from crest 110 to trough 112, is about 4 (four) millimeters. The distance along the tear seam 100 (from left to right as viewed in FIG. 6) between adjacent crests 110, is about 8 (eight) millimeters.

The outer cover 80 is assembled to the inner cover 30 as follows. The three pieces 82, 84 and 85 of the outer cover 80 are first sewn together, as discussed above. An operator then applies glue to the inner side surface 92 of the outer cover 80 and to the outer side surface 42 of the inner cover 30.

The operator then positions the outer cover 80 over the inner cover 30 and lines up the upper stitching section 88 (between the upper and middle pieces 82 and 84 of the outer cover) with the upper groove 46 on the inner cover. The upper stitching section 88, which is thicker than the surrounding material, is pressed into the upper groove 46. In addition, the emblem opening 86 on the middle piece 84 of the outer cover 80 is aligned with the emblem recess 50 on the inner cover 30.

This alignment of the upper stitching section 88 with the upper groove 46, and of the emblem opening 86 with the emblem recess 50, sets the proper alignment of the outer cover 80 with the inner cover 30. Specifically, the inner tear seam 70 is located a predetermined distance down from the upper groove 46 and from the emblem recess on the inner cover 30. Also, the outer tear seam 100 is located a predetermined distance down from the upper stitching section 88 and from the emblem opening 86 on the outer cover 80. As a result, when the outer cover 80 is thus properly aligned with the inner cover 30, the centerline 114 of the inner tear seam 100 is approximately centered on the centerline 60 of the inner tear seam 70.

The upper halves of the outer tear seam undulations 116, including the crests 110, are located above the inner tear seam 70. The lower halves of the outer tear seam undulations 116, including the troughs 112, are located below the inner tear seam 70. The outer tear seam 100 intersects the inner tear seam 70 at a plurality of locations 128 spaced along the length of the tear seams. All of the undulations 116 of the waveform configuration of the outer tear seam 100 overlie the inner tear seam 70.

It should be understood that the proper alignment of the outer cover 80 with the inner cover 30 can be set using something other than the alignment of the upper stitching section 88 with the upper groove 46 and the emblem opening 86 with the emblem recess 50. Regardless, when the inner and outer covers 30 and 80 are so aligned, the centerline 114 of the outer tear seam 100 will approximately overlie the centerline 60 of the inner tear seam 70.

After the outer cover 80 is positioned on the inner cover 30, the operator smooths out the material of the outer cover. The operator visually checks at the left and right side edges 38 and 40, to make sure the outer tear seam 100 is aligned with the inner tear seam 70. The material of the outer cover 80 is then wrapped around the edges of the inner cover 30. An emblem is installed in the emblem opening 86 and emblem recess 50. The finished cover 10 is thereafter assembled with the steering wheel and the air bag module 22.

The inner and outer tear seams 70 and 100 might not line up exactly when the outer cover 80 is mounted on the inner cover 30, because of manufacturing or assembly tolerances. If this occurs, the non-linear or wavy configuration of the outer tear seam 100 ensures that the outer tear seam at least partially overlies the inner tear seam 70. The greater width 122 of the outer tear seam 100 compared to the width 76 of the inner tear seam 70 provides a predefined tolerance for positioning the outer cover 80 on the inner cover 30. As a result, the outer tear seam 100 extends over at least a portion of the inner tear seam 70 when the outer cover 80 is within a predetermined range of positions relative to the inner cover 30. This allows for some variation or tolerance in the mounting of the outer cover 80 to the inner cover 30.

Figure 7:
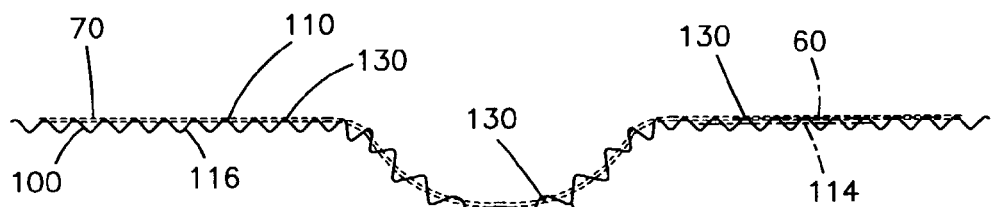
FIGS. 7 through 10 are a series of schematic views showing different alignments of the outer tear seam and the inner tear seam.

For example, the outer tear seam 100 may be located with its centerline 114 below the centerline 60 of the inner tear seam 70, as shown in FIG. 7. In this case, so long as the centerlines 114 and 60 are not separated by more than half the crest to trough distance 122 of the outer tear seam 100, then at least a portion (the crests 110) of the outer tear seam 100 overlies the inner tear seam 70. For example, if the crest to trough distance 122 of the outer tear seam 100 is about four millimeters, then so long as the centerlines 114 and 60 are not separated by more than two millimeters, the crests 110 of the outer tear seam 100 overlie the inner tear seam 70.

Because of its configuration and width, the outer tear seam 100 intersects the inner tear seam 70 at a plurality of locations numbered 130 that are spaced along the length of the tear seams. At least some of the undulations 116 of the waveform configuration of the outer tear seam 100 overlie the inner tear seam 70.

Figure 8:
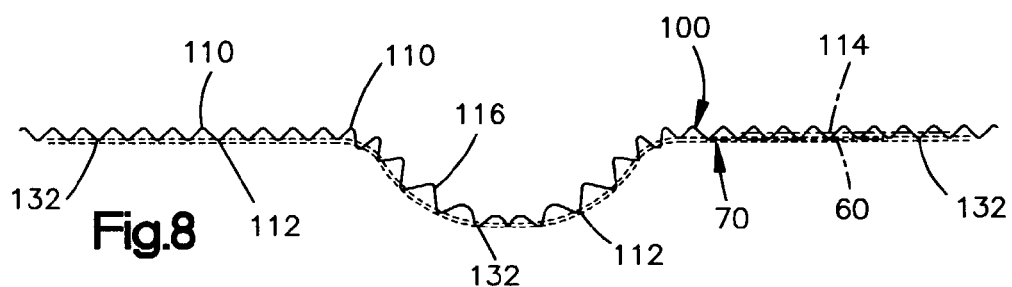

As another example, the outer tear seam 100 may be located with its center line 114 above the centerline 60 of the inner tear seam 70, as shown in FIG. 8. In this case, so long as the centerlines 114 and 60 are not separated by more than half the crest to trough distance 122 of the outer tear seam 100, then at least a portion (the troughs 112) of the outer tear seam 100 overlie the inner tear seam 70. For example, in the illustrated embodiment, the troughs of the outer tear seam 100 overlie the inner tear seam 70. Because of its configuration and width, the outer tear seam 100 intersects the inner tear seam 70 at a plurality of locations 132 spaced along the length of the tear seams.

Figure 9:
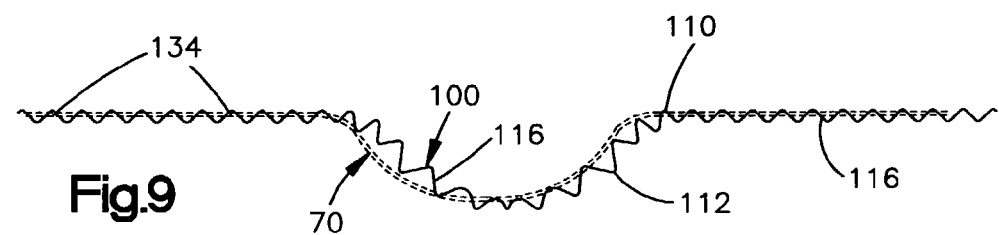

As yet another example, the outer tear seam 100 can be aligned vertically but displaced laterally from its ideal location relative to the inner tear seam 70, as shown in FIG. 9. In this case, because of its configuration and width, the outer tear seam 100 intersects the inner tear seam 70 at a plurality of locations 134 spaced along the length of the tear seams. Also, at least some of the undulations 116 of the waveform configuration of the outer tear seam 100 overlie the inner tear seam 70.

Figure 10:
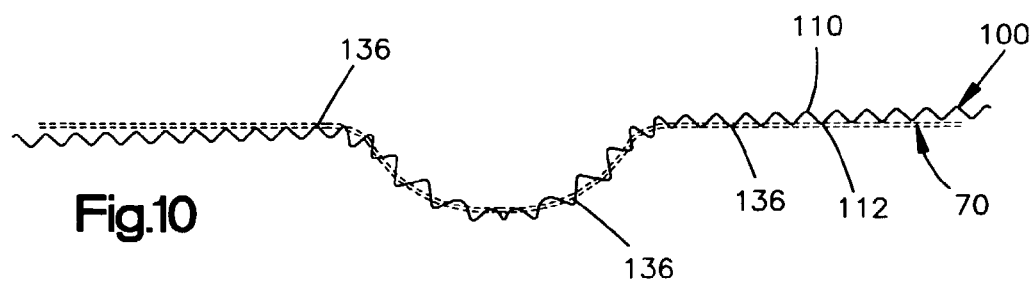

As still another example, the outer tear seam 100 can be rotated relative to the inner tear seam 70, as shown in FIG. 10. In this case, because of its configuration and width, the outer tear seam 100 still intersects the inner tear seam 70 at a plurality of locations 136 spaced along the length of the tear seams. Also, at least some of the undulations 116 of the waveform configuration of the outer tear seam 100 overlie the inner tear seam 70.

Thus, the outer cover 80 can be positioned anywhere on the inner cover 30 within a predetermined range of locations determined by the width 122 of the outer tear seam 100, and at least a portion of the outer tear seam will overlie the inner tear seam 70.

When the inflator 26 (FIG. 1) of the air bag module 22 is actuated, inflation fluid is directed into the air bag 24. The air bag 24 inflates and pushes outward on the cover 10. The force of the inflating air bag 24 is directed against the inner side surface 44 of the inner cover 30. When this force reaches a predetermined amount, the inner cover 30 ruptures at the inner tear seam 70.

The force applied by the inflating air bag 24 to the inner cover 30 is transmitted through the inner cover 30 to the outer cover 80. This force causes the outer cover 80 to rupture along the length of the outer tear seam 100. The upper and lower parts 72 and 74 of the inner cover 30 separate, and the upper and lower parts 106 and 108 of the outer cover 80 also separate. The upper parts 72 and 106 of the cover 10 pivot outward and upward, and the lower parts 74 and 108 of the cover pivoting downward and outward. The air bag 24 inflates through the open cover 10 into a position to help protect the driver of the vehicle.

Because at least a portion of the outer tear seam 100 is aligned with or overlies the inner tear seam 70, the outer cover 80 ruptures at about the same location as the inner cover 30. This allows the cover 10 as a whole to rupture under the application of a predetermined amount of force from the inflating air bag 24. If the outer tear seam 100 were spaced apart from the inner tear seam 70 because of misalignment of the outer cover 80 and the inner cover 30, with no portions of the tear seams overlying, then the amount of force needed to rupture the outer cover could increase substantially. With the present invention, a properly functioning alignment of the inner and outer covers 30 and 80, ensuring proper inflation of the air bag 24, is obtained even if the inner and outer covers are slightly misaligned during assembly. This result is obtained without a visible tear seam on the outer side surface of the outer cover 80.

From the above description of the invention, those skilled in the art will perceive improvements, changes and modifications in the invention. For example, the tear seam on the inner cover could have the wavy configuration and the tear seam on the outer cover the linear configuration. Such improvements, changes and modifications within the skill of the art are intended to be covered by the appended claims.

The invention claimed is:

1. A rupturable cover for a vehicle occupant protection apparatus that includes an inflatable vehicle occupant protection device and an inflator for providing inflation fluid to inflate the protection device from a deflated condition to an inflated condition, said cover for overlying said protection device when in the deflated condition, said cover comprising:
   an inner cover having inner and outer side surfaces; and
   an outer cover overlying said inner cover, said outer cover having an inner side surface adjacent to and overlying said outer side surface of said inner cover, said outer cover also having an exposed outer side surface and a width defined between opposite right and left edges;
   a first groove extending into said inner side surface of said inner cover and terminating prior to reaching said outer side surface of said inner cover, a thinner part of said inner cover, located between said first groove and said outer side surface of said inner cover, forming a first tear seam;
   a second groove extending into said inner side surface of said outer cover and defining a void in said outer cover, said void extending continuously in a generally widthwise direction across said outer cover and connecting said right and left edges of said outer cover, a thinner part of said outer cover, located between said second groove and said exposed outer side surface of said outer cover, forming a second tear seam;
   said first tear seam extending widthwise across said inner cover along a first path having a first configuration, said second tear seam extending widthwise across said outer cover along a second path having a second, different configuration, said second tear seam intersecting said first tear seam at a plurality of locations spaced from one another along said first and second paths, locations of intersection of said first and second tear seams being separated by non-intersecting locations in which said first and second tear seams are spaced apart from one another.

2. A cover as set forth in claim 1 wherein said first tear seam is relatively narrow and said second tear seam is relatively wide.

3. A cover as set forth in claim 1 wherein said second tear seam has a curvilinear, serpentine, or wavy configuration.

4. A cover asset forth in claim 1 wherein said second configuration of said second path of said second tear seam includes a plurality of undulations.

5. A cover as set forth in claim 1 wherein said second tear seam intersects said first tear seam at acute angles relative to a centerline of said first tear seam.

6. A cover as set forth in claim 1 wherein said first groove has a generally rectangular cross-sectional configuration and terminates at an end surface that extends generally parallel to said outer side surface of said inner cover.

7. A cover as set forth in claim 1 wherein said outer cover is made from leather and said second tear seam has a wavy configuration.

8. A rupturable cover for a vehicle occupant protection apparatus that includes an inflatable vehicle occupant protection device and an inflator for providing inflation fluid to inflate the protection device from a deflated condition to an inflated condition, said cover for overlying said protection device when in the deflated condition, said cover comprising:
   an inner cover having inner and outer side surfaces; and
   an outer cover overlying said inner cover, said outer cover having an inner side surface adjacent to and overlying said inner cover, said outer cover having an exposed outer side surface;
   said inner cover having a first tear seam defining a first continuous groove extending across said inner side surface of said inner cover, said first continuous groove defining a first void that extends into said inner side surface of said inner cover and terminates prior to reaching said outer side surface of said inner cover, said first tear seam rupturing in response to inflation of said protection device;
   said outer cover having a second tear seam defining a second continuous groove, said second continuous groove, defining a second void that extends into said outer cover from said inner side surface of said outer cover and terminates prior to reaching said exposed outer side surface of said outer cover, said second tear seam rupturing in response to inflation of said protection device;
   said first continuous groove having a first configuration and said second continuous groove having a second, different configuration;
   at least a portion, of said second continuous groove overlying and at least partially extending across said first continuous groove when said outer cover overlies said inner cover in any one of a plurality of different positions of alignment relative to said inner cover, said second continuous groove, when extending across said first continuous groove, being spaced apart from said first continuous groove by said first tear seam, and said first tear seam being located outside of said second continuous groove so a void formed by said second continuous groove separates said first and second tear seams at locations in which said second continuous groove extends across said first continuous groove.

9. A cover as set forth in claim 8 wherein said outer cover is made from leather.

10. A cover as set forth in claim 8 wherein said first tear seam is relatively narrow and said second tear seam is relatively wide.

11. A cover as set forth in claim 8 wherein said second tear seam has a configuration that includes a plurality of undulations, at least some of said undulations overlying said first tear seam.

12. A cover as set forth in claim 8 wherein said second tear seam intersects said first tear seam at a plurality of locations spaced apart from one another.

13. A cover as set forth in claim 12 wherein locations of intersection of said first and second tear seams are separated by non-intersecting locations in which said first and second tear seams are spaced apart from one another.

14. A cover as set forth in claim 13 wherein said second tear seam intersects said first tear seam at acute angles relative to a centerline of said first tear seam.

15. A cover as set forth in claim 8 wherein said first continuous groove has a generally rectangular cross-sectional configuration and terminates at an end surface that extends generally parallel to said outer side surface of said inner cover.

16. A cover as set forth in claim 8 wherein said second tear seam has a curvilinear, serpentine, or wavy configuration.

* * * * *